United States Patent [19]

Mantello

[11] Patent Number: 4,698,282

[45] Date of Patent: Oct. 6, 1987

[54] SAFETY VENT DEVICE FOR ELECTROCHEMICAL CELLS

[75] Inventor: Ralph Mantello, Northvale, N.J.

[73] Assignee: Power Conversion Inc., Elmwood Park, N.J.

[21] Appl. No.: 869,975

[22] Filed: Jun. 2, 1986

[51] Int. Cl.[4] .......................................... H01M 2/12
[52] U.S. Cl. ...................................... 429/56; 429/53; 220/207; 220/89 A
[58] Field of Search .................... 429/53, 56; 220/207, 220/266, 281, 89 A; 215/253

[56] References Cited

U.S. PATENT DOCUMENTS

| | | | |
|---|---|---|---|
| 3,850,339 | 11/1974 | Kinkel | 220/89 A |
| 3,851,782 | 12/1974 | Clawson et al. | 215/307 |
| 3,918,610 | 11/1975 | Willis | 222/397 |
| 3,921,556 | 11/1975 | Wood et al. | 113/120 R |
| 4,484,691 | 11/1984 | Lees | 220/89 A |
| 4,576,303 | 3/1986 | Mundt et al. | 220/89 A |
| 4,588,101 | 5/1986 | Ruegg | 220/89 A |
| 4,601,959 | 7/1986 | Romero | 429/53 |
| 4,610,370 | 9/1986 | Patterson et al. | 220/207 |

*Primary Examiner*—John F. Niebling
*Assistant Examiner*—Steven P. Marquis
*Attorney, Agent, or Firm*—Lieberman, Rudolph & Nowak

[57] ABSTRACT

The present invention relates to a venting device for a sealed container, and more particularly to a safety venting device for a Lithium cell. The venting device is located on one of the two ends of a sealed container. The vent is comprised of a circular member which is recessed in the container end whereby it is concave with respect to the exterior of the container. Extending between the circular member and the container end are scored lines of weakness. As pressure increases in the container, the circular member deflects so as to develop stresses which become concentrated on the scored lines causing them to rupture at a predetermined pressure.

2 Claims, 4 Drawing Figures

SAFETY VENT DEVICE FOR ELECTROCHEMICAL CELLS

BACKGROUND OF THE INVENTION

The present invention relates to a venting device for relieving pressure in response to an over-pressure condition existing within a pressure vessel. More particularly, the present invention relates to electrochemical cells capable of venting at predetermined over-pressure conditions.

Electrochemical cells, such as Lithium type batteries, undergo chemical reactions which product high pressures within the cells. For this reason, the cell cans of Lithium type batteries are generally comprised of a metal material capable of withstanding such high pressures and attack from the enclosed reactive chemicals. However, unusual conditions such as external shorts, presence of low impedance internal shorts or inadvertent exposure to excessive temperatures can cause increases in cell pressures which, if not relieved, could cause a cell to explode. Generally, a mechanical safety vent is thus incorporated in Lithium type cells as a safeguard against the catastrophic results which could occur under such conditions.

Prior to the present invention, cell types which have utilized vents have been unitary in structure with a portion of the side wall of the can deliberately weakened by thinning it so that an opening would be formed in the side wall of the can at elevated pressures to allow for pressure relief. However, such vents are dependent upon elastic stretching of the can's material, and as such, the venting characteristics cannot be accurately controlled due to various factors including curvature, thickness and material condition. For example, the pressure at which a vent is formed with such venting device is determined not by the stable elastic properties of the can's material, but by its ultimate plastic deformation behavior which is dependent upon composition and the mechanical and thermal history of the can.

Numerous devices have been suggested for venting pressure vessels. Vents in general have been constructed as one time safety devices in which pressurized material is permitted egress from an enclosed space. U.S. Pat. No. 3,918,610 disclosed one such vent for an aerosol container consisting of a "bridge" area which spans a hollow grove. The bridging "rib" has across it a score or weakening line extending transversely to the direction of the bridge. When the pressure becomes excessive within the aerosol container, the rib will fracture on the score line to vent the pressure from the container. Although this venting device has been used, it obviously requires intricate and correspondingly expensive manufacturing of the "bridge" area.

Another invention for venting a pressure vessel is disclosed in U.S. Pat. No. 3,463,351. This invention utilizes a concave-convex rupture disc containing lines of weakness on either surface and a member attached to its concave surface to achiever full opening without fragmentation.

The concave-convex disc vent, by its very nature, is inefficient in its utilization of space. Additionally, this vent, as disclosed, requires that the rupture disc be held in place between two pipe flanges. Such an application would be difficult, as well as expensive, to apply in a pressure vessel of limited dimensions, as for example in a Lithium cell.

The present invention discloses an improved safety vent which overcomes the drawbacks of the art of record in venting electrochemical cells, and in particular, Lithium cells.

SUMMARY OF THE INVENTION

The invention is directed to a safety venting device for relieving excessive pressure in electromechanical cells, and in particular, in Lithium cells. The venting device as disclosed is located on either the top or bottom of the cell can, and is designed to rupture along predesigned scored lines of weakness, so as to preclude case rupture in over-pressure situations.

The venting device consists of a shallow reverse drawn cup area on one end of the cell can. Extending from the edge of the can to be recessed cup area are scored lines of variable dimension. The scored lines weaken the can so that the pressure at which the can will vent will be determined by the number of scored lines, the size of each score line, its thickness and the size of the recessed cup area.

It is, therefore, an object of the present invention to provide a venting device which can reliably vent a sealed contained at a predetermined pressure.

It is a furher object of the present invention to provide a venting device which is inert to internal reactive materials.

It is another object of the present invention to provide a venting device which is resistant to external shock and abuse.

Yet a further object of the present invention is to provide a venting device which utilizes the minimum amount of space of a cell in order to give maximum performance and capacity from the cell.

The above and other objects and advantages of the present invention will be apparent from the following description and the drawings appended thereto.

DETAILED DESCRIPTION

Figure 1:
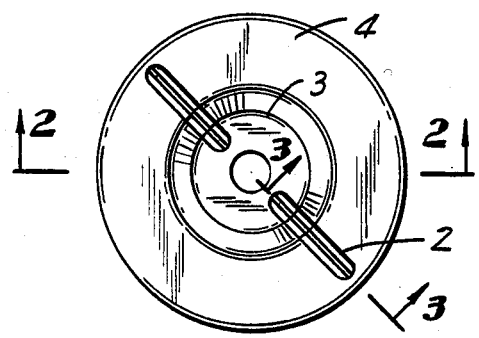
FIG. 1 is a top view of one end of a cell can with the recessed cup area and radially extending scored lines of one embodiment of the invention.
Figure 2:
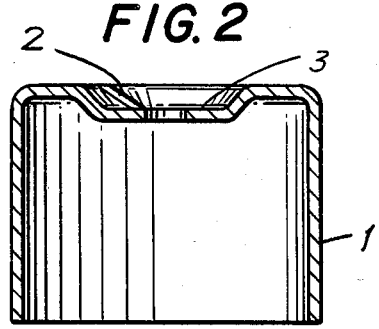
FIG. 2 is a cross-sectional view of the cell can and recessed cup area through 2—2.

Refer to FIGS. 1 and 2. Therein is shown a cell can 1 with a recessed cup area 3 and a can base 4. Extending between can base 4 and recessed cup area 3 are scored lines 2. Although two scored lines are shown in FIG. 2, it is important to note that the number of scored lines, their thickness and the diameter of the recessed cup area 3 are all variable depending on the required venting pressure of the venting device. Thus, the present invention discloses a venting device capable of venting at a variety of designed pressures.

Figure 3:
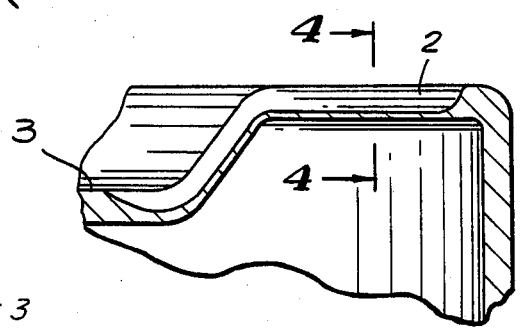
FIG. 3 is an enlarged cross-sectional view of the vent cup and scored lines through 3—3.
Figure 4:
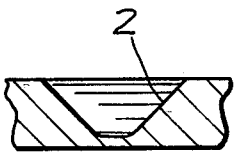
FIG. 4 is an enlarged cross-sectional view of the venting device scored line through 4—4.

The scored lines 2 reduce the thickness of can base 4 and the recessed cup area 3, as shown in FIGS. 3 and 4. The dimensions of the scored lines 2 are variable depending on the desired venting pressure to be obtained. Thus, by increasing the number, depth, width or length of the score lines 2, a lower venting pressure will be realized.

As shown in FIGS. 1 and 3, the scored lines 2 extend from the edge of can base 4 to the edge of the cup area 3. The scored lines 2 are essentially "V" shaped in dimension, as shown in FIG. 4, the angle of the groove being approximately 45 degrees with respect to the bottom thereof. When an internal pressure condition develops the recessed cup area 3 will deflect causing internal stresses to develop. The stresses developed are thereby concentrated on the scored lines, causing rupture at a predetermined pressure. This design allows a pressure to be maintained in the container close to the container vent pressure without losing vent integrity.

Although the invention illustrated describes a venting device for a Lithium cell, it will be apparent to those skilled in the art that the same sort of venting device could also be used to vent pressure in any other pressure vessel, as for example in a sealed gas tank.

Thus, the foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A safety vent device for use with a normally sealed, electrochemical cell, said cell comprising two cylindrical end portions each having a nominal thickness throughout the surface area of said cylindrical end portions, said cylindrical end portions connected by an upstanding cylindrical sidewall, said safety vent device comprising:

a circular recessed portion positioned in a first cylindrical end portion of said normally sealed cell, said first cylindrical end portion being substantially flat, said circular recessed portion having a diameter less than the diameter of said first cylindrical end portion and being positioned generally in the center of said first cylindrical end portion;

at least one scored line extending radially from an edge of said recessed portion to the upstanding sidewall of said normally sealed cell, said scored line functioning to reduce the nominal thickness of said first cylindrical end portion, and;

said safety vent device remaining in a closed position to fully seal said normally sealed cell until an excessive pressure within said normally sealed cell urges said circular recessed portion positioned in said one cylindrical end portion to deflect, in turn causing said safety vent device to rupture along said score line thus unsealing said normally sealed cell and releasing said pressure.

2. A venting device in accordance with claim 1 wherein said scored lines have a substantially v shaped cross-section.

* * * * *